Figure 1:
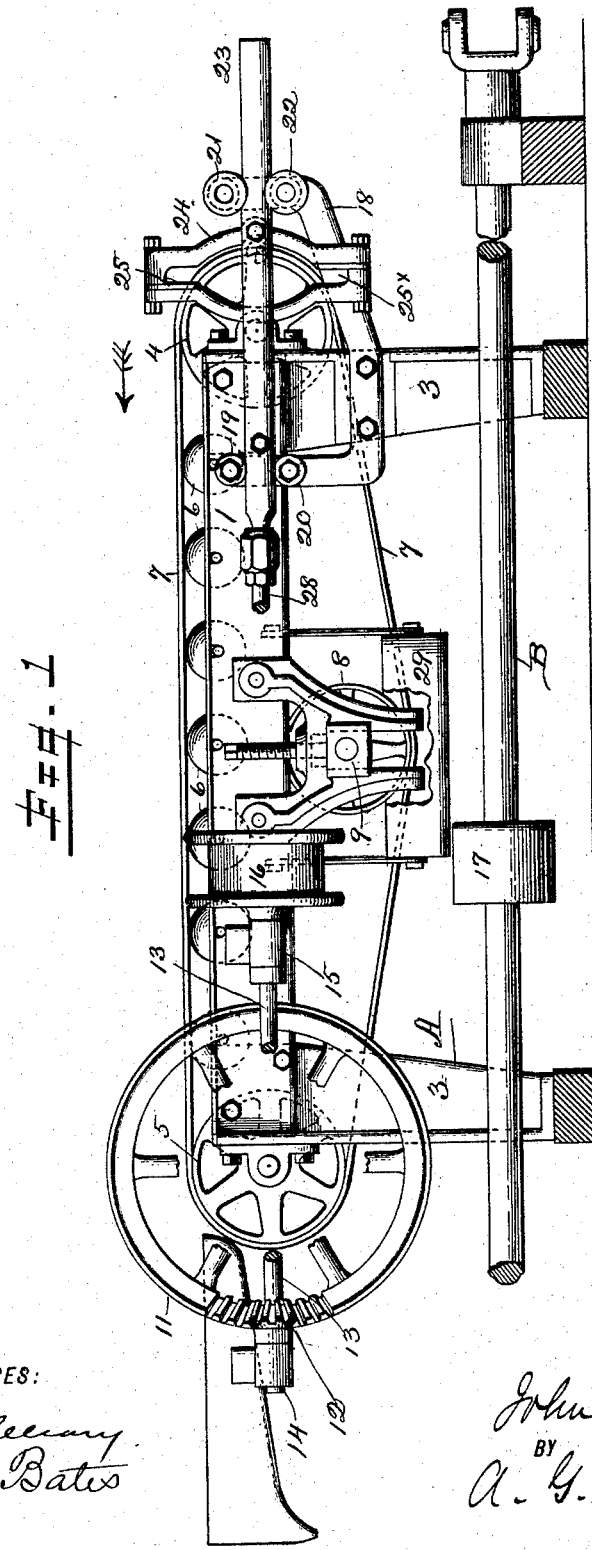

(No Model.) 8 Sheets—Sheet 1.

J. THOMPSON.
BRICK AND TILE CUTTING MACHINE.

No. 456,449. Patented July 21, 1891.

WITNESSES:
INVENTOR
John Thompson
BY
A. G. Huylman
ATTORNEY.

(No Model.) 8 Sheets—Sheet 2.
J. THOMPSON.
BRICK AND TILE CUTTING MACHINE.
No. 456,449. Patented July 21, 1891.
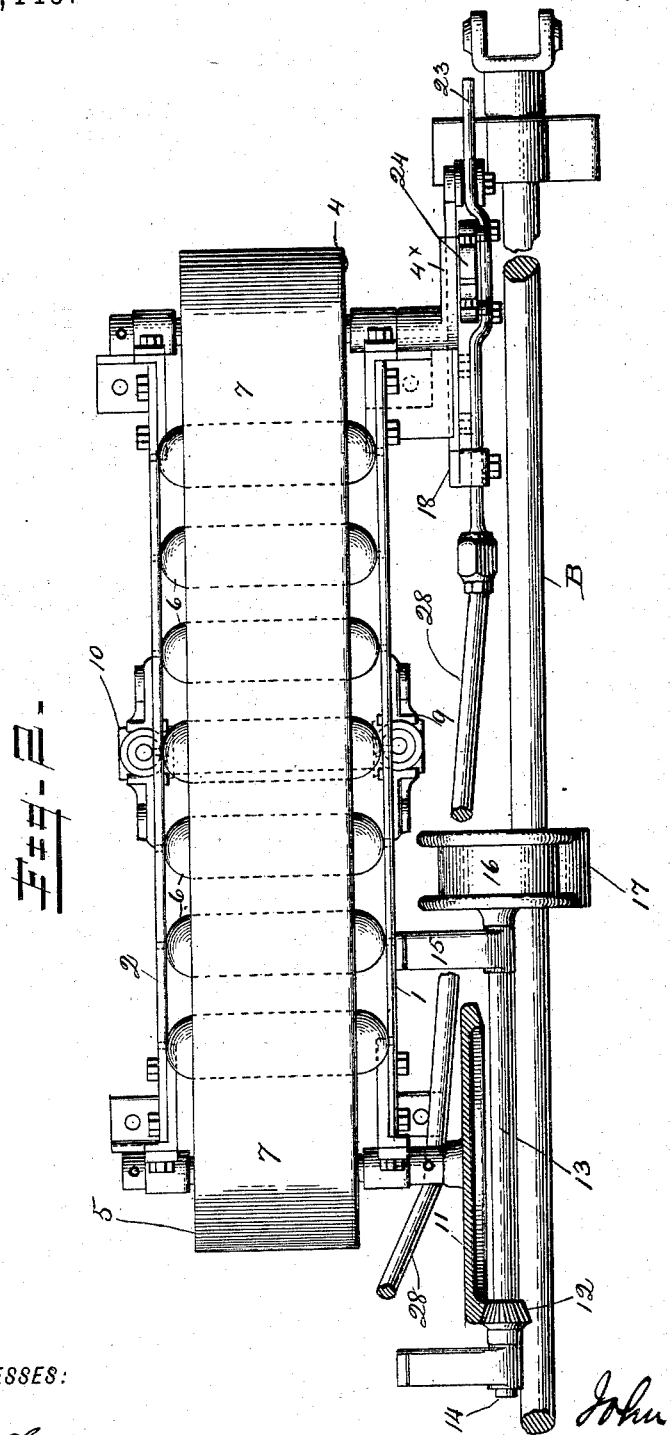
WITNESSES:
INVENTOR
John Thompson
BY
A. G. Heylman
ATTORNEY (No Model.) 8 Sheets—Sheet 3.
J. THOMPSON.
BRICK AND TILE CUTTING MACHINE.
No. 456,449. Patented July 21, 1891.
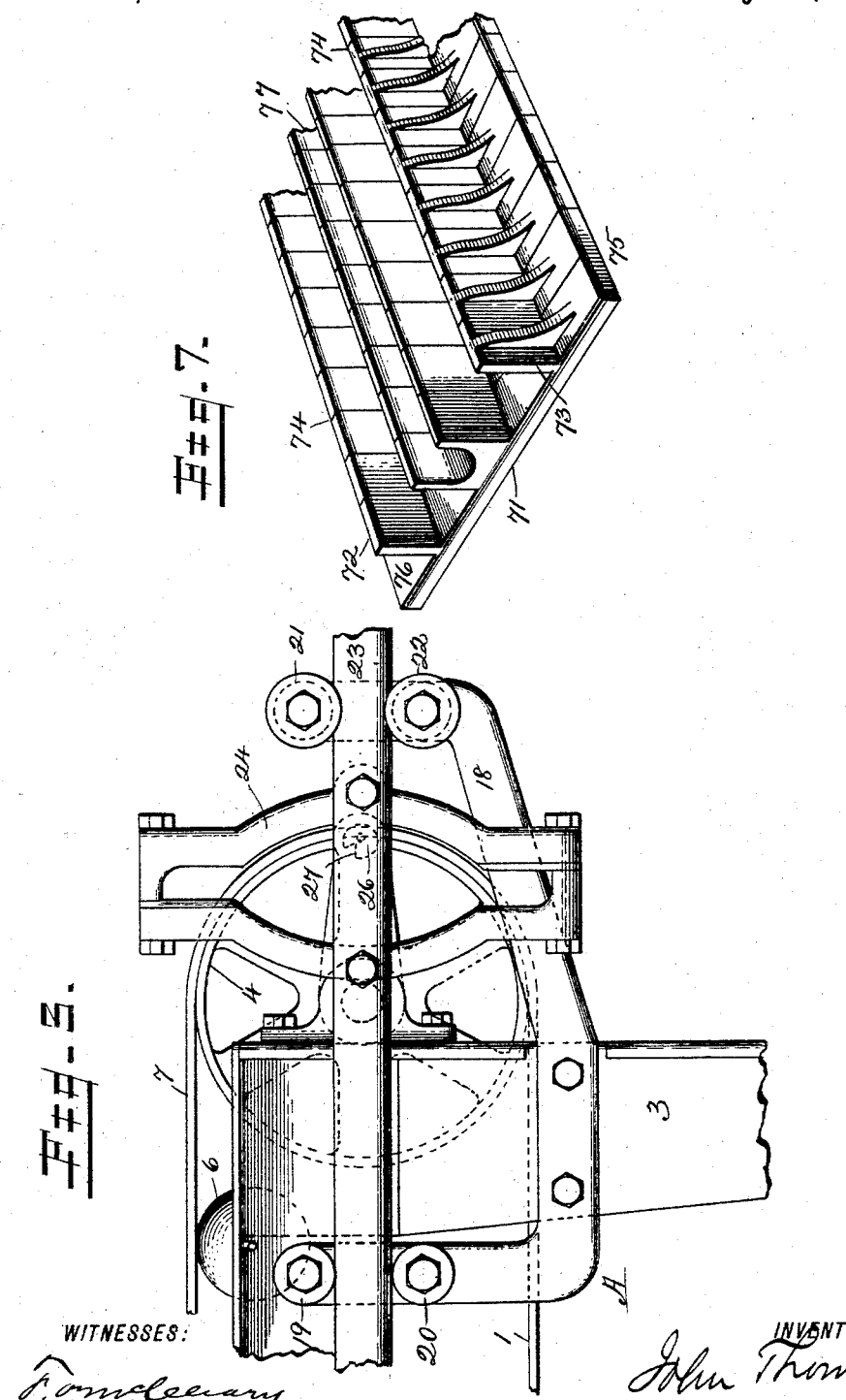
WITNESSES:
INVENTOR
John Thompson
BY
A. G. Huffman
ATTORNEY.

(No Model.) 8 Sheets—Sheet 4.
J. THOMPSON.
BRICK AND TILE CUTTING MACHINE.
No. 456,449. Patented July 21, 1891.
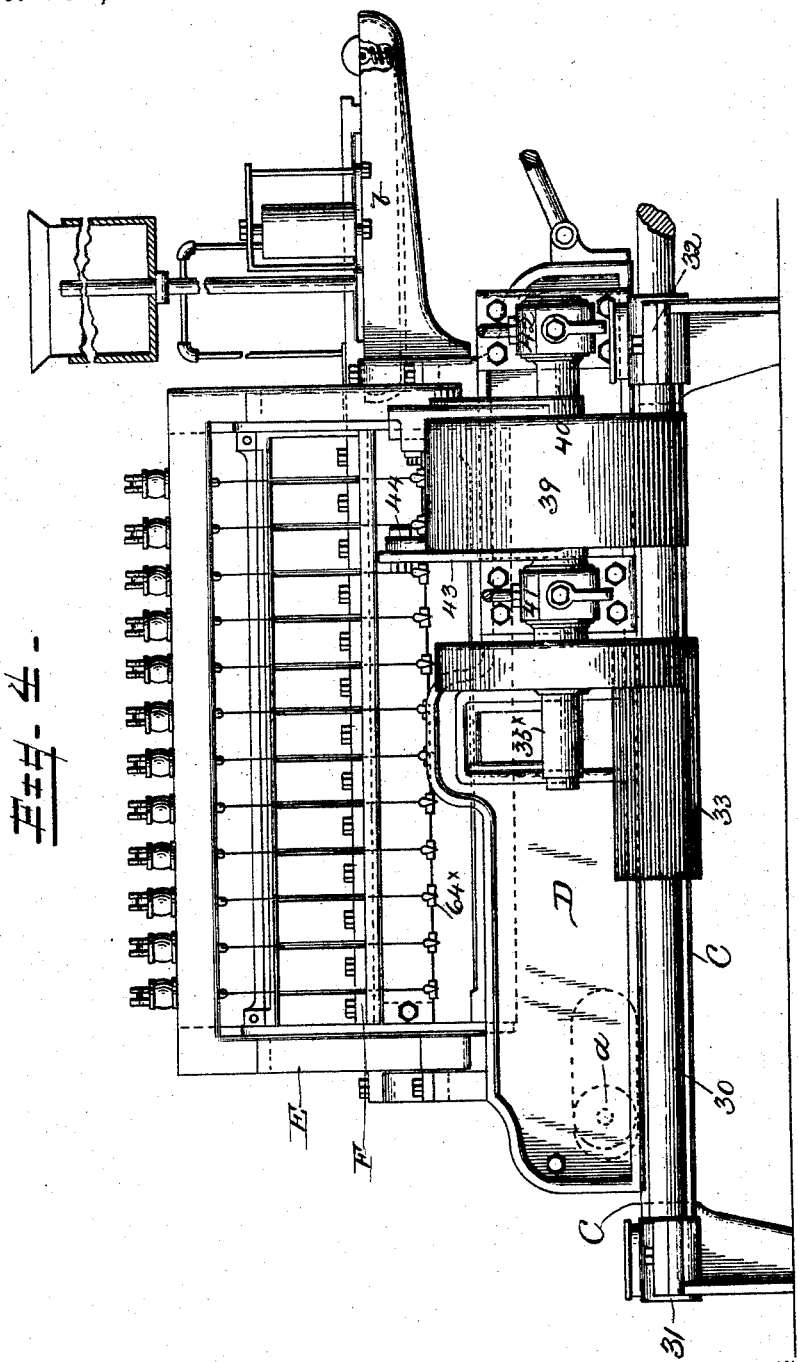
WITNESSES:
INVENTOR
John Thompson
BY
A. G. Heylmun
ATTORNEY.

(No Model.)

8 Sheets—Sheet 5

J. THOMPSON.
BRICK AND TILE CUTTING MACHINE.

No. 456,449.  Patented July 21, 1891.

(No Model.) 8 Sheets—Sheet 6.
J. THOMPSON.
BRICK AND TILE CUTTING MACHINE.
No. 456,449. Patented July 21, 1891.
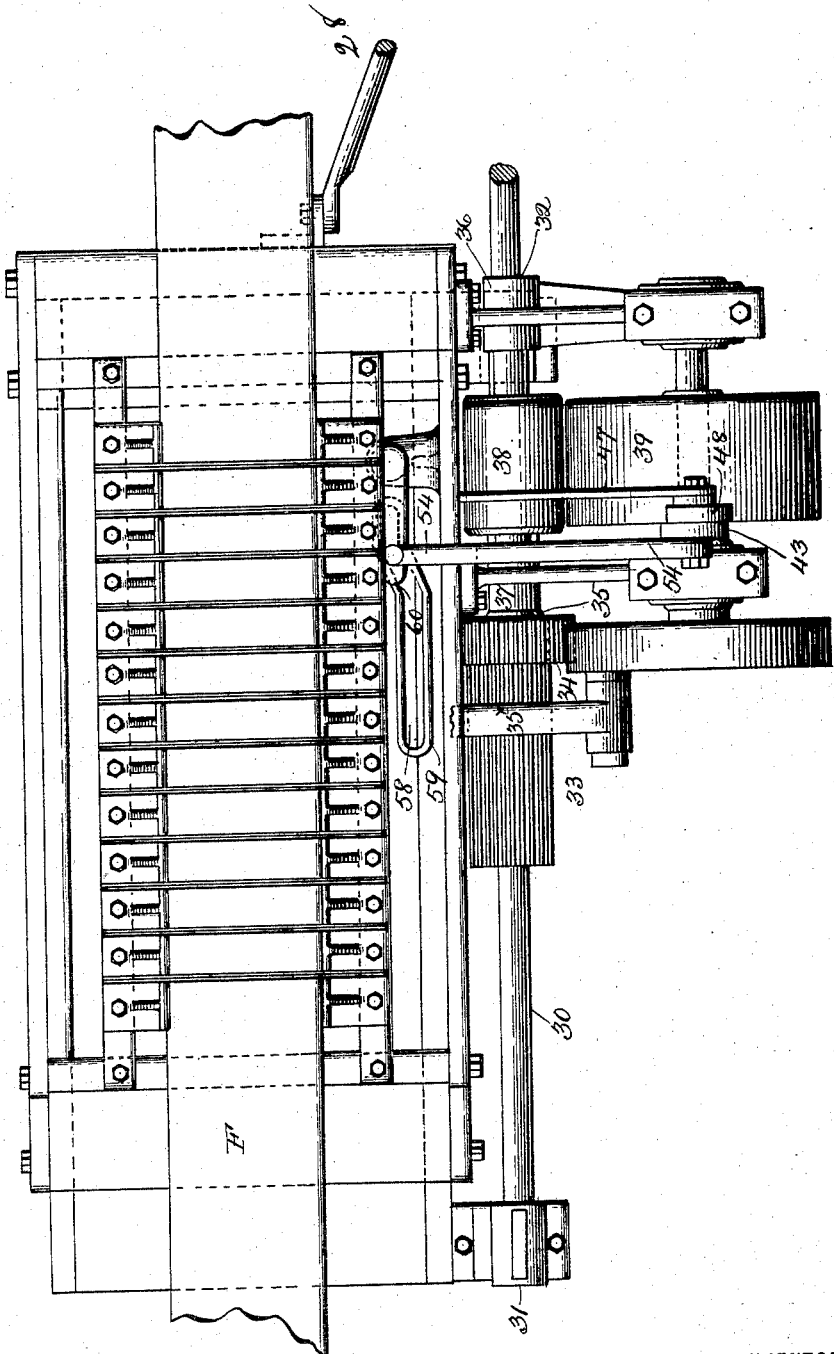
WITNESSES:
INVENTOR
John Thompson
BY
A. G. Heylman
ATTORNEY.

(No Model.) 8 Sheets—Sheet 7.
J. THOMPSON.
BRICK AND TILE CUTTING MACHINE.
No. 456,449. Patented July 21, 1891.
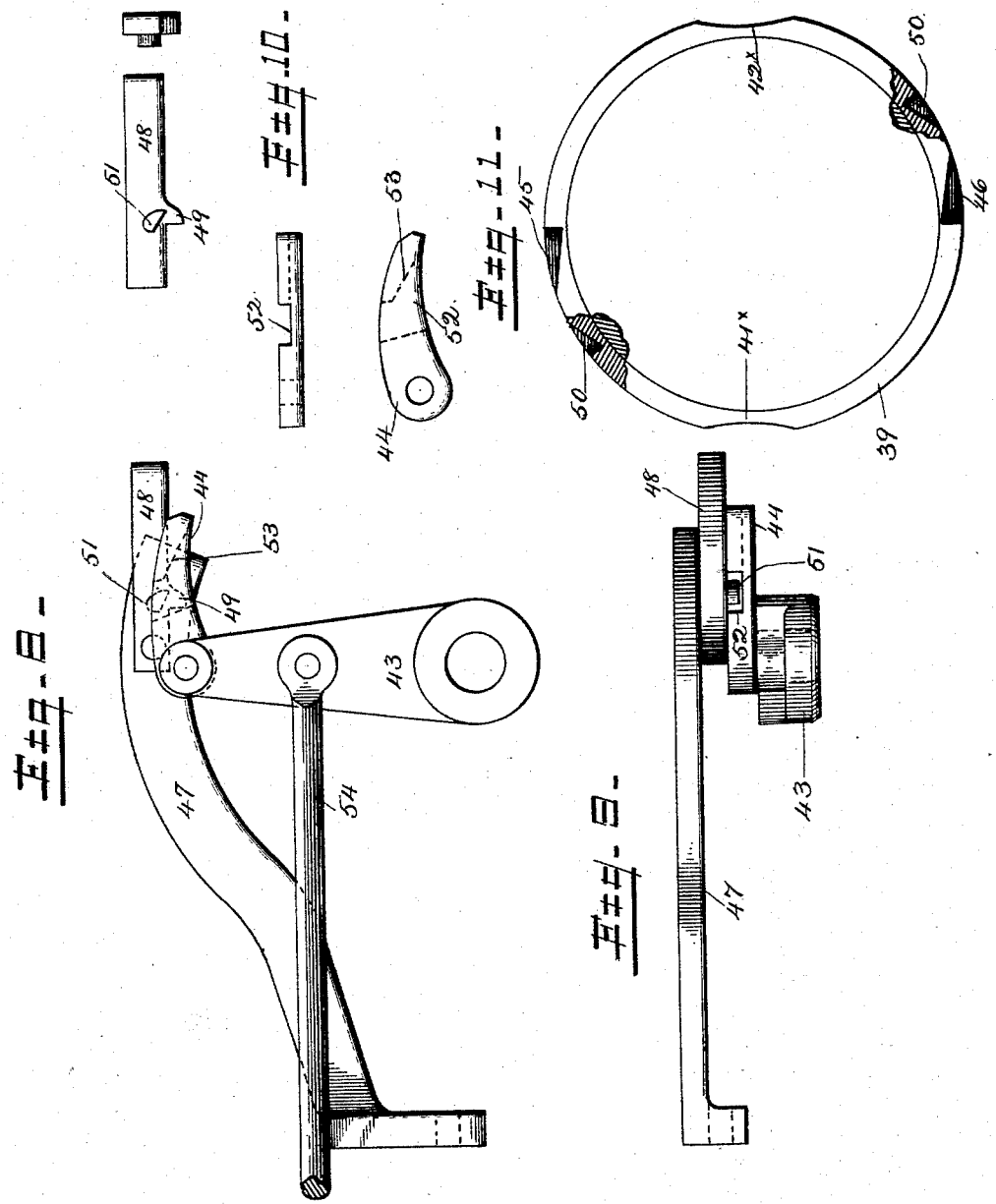
WITNESSES:
INVENTOR
John Thompson
BY
A. G. Hufsmun
ATTORNEY.

(No Model.) 8 Sheets—Sheet 8.
J. THOMPSON.
BRICK AND TILE CUTTING MACHINE.
No. 456,449. Patented July 21, 1891.
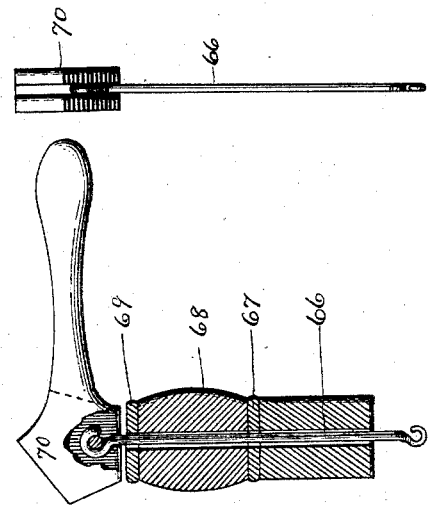
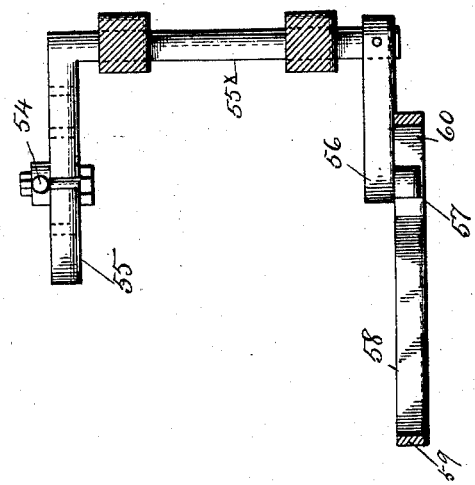

UNITED STATES PATENT OFFICE.

JOHN THOMPSON, OF BUCYRUS, OHIO, ASSIGNOR TO THE FREY-SHECKLER COMPANY, OF SAME PLACE.

BRICK AND TILE CUTTING MACHINE.

SPECIFICATION forming part of Letters Patent No. 456,449, dated July 21, 1891.

Application filed March 13, 1891. Serial No. 384,905. (No model.)

*To all whom it may concern:*

Be it known that I, JOHN THOMPSON, a citizen of the United States of America, residing at Bucyrus, in the county of Crawford and State of Ohio, have invented a new and useful Brick and Tile Machine, of which the following is a specification.

My invention has relation to improvements in mechanism for delivering the slab of clay from its machine to the cutting-table and in the cutting-table of the machine; and the objects are, first, to provide an improved double cutting mechanism whereby the clay delivered to the table is cut into determined sizes at both reciprocations of the cutting-frame, and, secondly, to provide improved mechanism for delivering the slab of clay from the clay-machine to the cutting-table, and, generally, to provide synchronously acting and automatically operating mechanisms to effect these objects.

I have hereinafter fully described the mechanisms by which I accomplish the purposes of my invention, and particularly pointed out and distinctly claimed the parts, combinations, and improvements embraced in the invention. I have also fully and clearly illustrated the invention in the accompanying drawings, wherein—

Figure 1 is a side view of the carrying or delivery table, which is stationed between the delivery end of the machine and the cutting-table and by connection with which the cutting-table mechanism is operated. Fig. 2 is a top plan view of the carrying and delivery table shown in Fig. 1. Fig. 3 is a detail view of the cam mechanism that operates the cutting-table mechanism. Fig. 4 is a side elevation of the cutting-table. Fig. 5 is an end view of the cutting-table. Fig. 6 is a plan view of the cutting-table, the platen, and the mechanism for operating the same. Fig. 7 is a view showing the platen used for cutting "end-cut" bricks with the central abutting partition. Fig. 8 is a detail side view of the latch mechanism for holding at rest and starting the cutting mechanism. Fig. 9 is a top view of the same. Fig. 10 is a view of the latches removed from their support. Fig. 11 is a detail end view of the friction-pulley, having notches for the engagement of the latch and "rest-spaces" at which the pulley stops. Fig. 12 is a detail of the vertical shaft and its connections for starting the cutting mechanism. Fig. 13 is a view of the means for holding and tightening the wires.

Referring to the drawings, A designates a substantial supporting-frame constituting the slab-carrying table or frame, composed of side pieces 1 2, supported on legs 3 and held in relative position by any suitable cross bars or pieces to maintain them parallel and in vertical condition. At the front end of this frame is journaled a drum 4, which is of such size that one revolution on its axis will measure the length of the column of clay to be fed to the cutting-table and subjected to the action of the cutting-wires. At the other end of the frame is journaled a drum 5, and between these drums in the frame is a series of rollers 6, the upper faces of which are on a line with those of the end drums, as shown in Fig. 1 of the drawings. About the end drums and resting on the intermediate rollers is a carrying apron or belt 7, the tension of which is regulated by means of a pulley 8, mounted on a shaft carried in vertically-adjustable bearings 9 10, Figs. 1 and 2. Ordinarily the weight and movement of the slab of clay as it is pushed from the dies onto this apron are sufficient to move the rollers and operate the connected mechanism; but to insure a positive movement and prevent the slab from slipping on the apron I extend the shaft of the drum 5 and mount thereon a wheel 11, Fig. 2, having bevel face-gear which engages a bevel-gear 12 on a shaft 13, journaled in bearings 14 15 on the frame, and on the shaft 13 is fixed a pulley 16, which has belt connection (not shown) with a pulley 17, Figs. 1 and 2, on the driving-shaft B, leading to a source of power. The means for imparting motion in longitudinal direction to the cutting-table frame is mounted on this table A, and this I now proceed to describe.

On the side of the frame at the end nearest the clay-mill is fixed a strong bracket 18, Figs. 1 and 2, having its ends directed upward, as shown, and having journaled thereto guide-rollers 19 20 and 21 22, between which is disposed a bar 23, arranged to slide between the guide-rollers. On this bar 23 is fixed a yoke 24, elongated vertically and of elliptical shape, with the end terminating in recesses 25 $25^\times$. On the axle of the drum 4 is mounted a disk or wheel $4^\times$, Fig. 2, having a pin 26, Fig. 3, fixed in the edge face thereof, which pin projects in the yoke and bears against the surface of the yoke, and in the revolution of the disk reciprocates the yoke and bar. The pin 26 has a notch 27 in it to engage against the vertical walls of the respective recesses of the yoke and pushes it in opposite directions. The yoke is shown in Fig. 1 as at the backward limit of its movement, which point was attained when the pin 26 engaged and lodged against the vertical side of the recess $25^\times$, and since the pin afterward travels on the curve of the yoke, which is the same as that of the disk, the yoke does not move; but when the pin reaches the upper recess, the notch of the pin engages the vertical wall of the recess and pushes the yoke, with the bar along with it, until the pin moves out of engagement and travels down the curve of the ellipse. It will thus be perceived that the bar is reciprocated a distance of one-half the diameter of the drum and that it stands at rest between the engagements of the pin with the respective recesses in the yoke. This mechanism moves the connecting-rod 28, attached to the end of the cutting-table, Fig. 6, and reciprocates that table in endwise direction. These movements of the yoke and bar are arranged to take place and be maintained at the time and for the time that the cutting-table is being moved in the respective reciprocations across the column of clay on the platen. The connecting-rod 28 is directed inward from its connection with the bar 23 to the attachment to the frame of the cutting-table, as indicated in Figs. 2 and 6 of the drawings, to give a more central pull to the table. While the pin 26 is traversing the curves of the yoke and the yoke is at rest, the column of clay is being pushed on the platen, and reaches the proper position when the upper recess is engaged, when the cutting mechanism is brought again into operation and the slab severed into forms. Under the pulley 8 is arranged a sand-box 29, Fig. 1, through which the apron 7 passes, and is supplied with sand to give dry frictional contact between the apron and the slab of clay carried by it over the rollers.

Referring to Figs. 4 and 5 of the drawings it will be perceived that the stationary base has ways or tracks on its side pieces, and that the longitudinally or endwise moving frame is mounted thereon by wheels bearing on the tracks of the stationary frame. These parts or elements are substantially of the construction shown in the drawings, and are generally and well known in the art. The base-frame, which supports the other elements, is designated by C and the tracks by $c$, the longitudinally-movable frame mounted on the stationary frame by D, and its wheels by $d$, and carried by the latter frame is my improved cutting mechanism.

On the stationary frame C is a shaft 30, Fig. 4, journaled in boxes 31 32, and on the shaft is fixed a long pinion 33, made of the requisite length to permit the gear-wheel 34, Fig. 5, to travel in it while the movements of the frame D are in progress and during the time motion is communicated to the cutting-frame. The gear-wheel 34, Fig. 5, is fixed on a shaft 35, journaled in boxes 36 37, Fig. 6, secured to the movable frame D. On the shaft 35, Fig. 6, is keyed a friction-pulley 38, which bears against the surface of a friction-pulley 39, made fast to a shaft 40, Fig. 4, journaled in boxes 41 42 in supports projected from the side of the movable frame. These boxes 41 42 are made adjustable, so that the bearing force of the friction-pulleys may be regulated. On the end of the shaft 40 is a crank-wheel, to which is connected one end of a pitman $35^\times$, the outer end of which is connected to the cutting-frame, and by this connection pulls the wire-frame transversely across the column of clay. Except the improvements made to the friction-pulley 39 and the direct connection to the pitman to the wire-frame, these elements are substantially identical with the mechanism shown and described in my pending application, Serial No. 377,997, filed January 16, 1891. The main or line shaft 30 is connected to any proper source of power adequate to operate the mechanism. The friction-pulley 39, Fig. 11, has portions of its face depressed or cut away on opposite points, as at $41^\times$ $42^\times$, at which points the driving friction-pulley 38 has no bearing on it, the object being to provide "rest-points" until the renewal of motion is required, as hereinafter specified, to reciprocate the wire-frame. The friction-pulley 39 is designed to make but a half-revolution and stops at each rest-point. After the friction-pulley 39 reaches its rest-points it must at the proper time be turned past the point at which it stops to bring its frictional surface again in contact with the other frictional pulley to reciprocate the wire-frame. To accomplish this, I provide the following-described mechanism: An arm 43, Fig. 4, is loosely mounted on the shaft 40, adjacent to the friction-pulley 39 and arranged to swing with its free end concentric with the rim of the pulley. On the end of the arm is pivoted a pawl 44, which at stated intervals of the revolution of the pulley and when it stands at rest engages in the notches 45 46, Fig. 11, in the rim of the wheel and pushes the pulley past its rest-points into engagement with the friction-wheel which drives it. It being necessary to hold the friction-wheel 39 stationary at times and secure at its rest-points, an arm 47, Figs. 5 and 9, is bolted to the frame of the machine and extends over the friction-pulley, being curved to rest on or align with the face of the pulley. On the free end of this arm 47 is pivoted a latch 48, having a lug 49, Fig. 10, to engage notches 50, Fig. 11, in the friction-pulley, and thus hold the pulley in fixed position. The latch 48 is released as follows: On the side of the latch 48 is a lug 51, Figs. 9 and 10, having a rounded upper surface and an inclined under face, as shown, and in the pawl 44 is a cut-away space 52, having an inclined edge 53, the lug entering into the space and permitting the latch 48 to drop into engagement with the notch in the pulley. Now when the arm draws the pawl 44 back it rides over the lug on latch 48 and is carried back until its end drops down behind the lug and on the pulley. At this time the arm begins its return movement and pushes the nose of the pawl under the incline of the lug and consequently lifts the latch from engagement, and, proceeding forward, engages the notch and pushes the pulley past its rest-point into engagement with the driving friction-pulley. These movements of the arm and releasement and engagement of the latch and pawl take place and are effected by means of a connecting-rod 54, Figs. 5 and 6, pivotally connected to the arm 43, and at the other end connected to an arm 55, Fig. 12, on the top of an upright shaft $55^\times$, held in bearings on the inside of the moving frame and having on its lower end another arm 56, carrying in its free end a roller or pin 57, which engages in a slot 58, formed in a plate 59, Fig. 6, secured to the stationary frame, substantially as shown. The slot 58 is made straight for the greater portion of its length, and at the forward end is inclined inward, as at 60, so that as the frame D is moved the roller 57 travels outward in the slot and moves the connecting-rod 54 and the pawl, turning the friction-wheel into contact with driving friction-wheel and starts the cutting-frame mechanism.

On shafts extended across the frame D are journaled rollers 61 62, Fig. 5, the hubs of which are extended and bear in slots 63 in the frame, which rollers support the wire-frame and carry it in its reciprocations.

E designates the wire-frames, composed of side frames formed with ways 64, in which the rollers 61 62 are arranged, substantially as seen in Fig. 5 of the drawings. These frames have arched top pieces, as shown, in the center of which are secured the cross-pieces $63^\times$, between which the wires are passed, and, extending down below the platens, are secured to hooks $64^\times$ on a cross-bar 65, as seen in Fig. 5. The upper end of the wire is secured to a hook-piece 66, Fig. 13, and the tension of the wires is made by the following means: On the cross-bar of the wire-frame at each wire is a washer 67, Fig. 13, through which the hook piece or rod 66 passes. On the washer with the rod through it is arranged an elastic cushion 68, having a light washer 69 on its top, and the top hook of the hook-rod is lodged on a cross-pin in an angular eccentric 70, having a handle, as shown. The angular eccentric is formed with its sides arranged in increasing distance from the pin, and consists of two corresponding flat plates projected from the handle, with a space between bridged by the pin, as shown. It will be readily perceived that by turning the eccentric to any one of its sides the wires will be correspondingly effected.

F designates the platen of the cutting-table, consisting of a series of frames mounted and secured at the ends to the frame D, substantially as seen in Figs. 5 and 6 of the drawings. These platen-pieces consist of a base-piece 71, Fig. 7, having oppositely-arranged vertical standards 72 73, constituting the abutting surfaces for the sides of the slabs of clay, and being arranged with interstices 74 between them for the passage of the wires. The standards also constitute a wire-cleaning means, which, in other constructions analogous to this, is effected by a special wire-cleaning frame. The bottom cross-pieces of the respective end pieces of the platen extend in opposite directions, as seen at 75 76, and form extensions of the platen to receive and take the cut forms, the latter being then carried onto an apron (not shown) and taken from thence to the place of deposit.

I have shown in the constructions described a platen to cut a "side cut" or flat slab of clay; but when end-cut bricks are made the machine discharges two columns of clay, running parallel with each other, in which operation the platen must be constructed to meet the manufacture, and for this purpose the platen-frames are provided with a central vertical partition 77, as shown in Fig. 7 of the drawings, between which and the standards of the platen the two slabs of clay move and are cut, the slots or interstices of the frames being extended through the partition, as shown. The partition forms in my improved platen an abutting means for the cut in both directions.

It will be perceived that the movements of the longitudinally-moving table may be made by any of the usual lever attachments used in light machines, and also that the back and forth cuts of the cutting-wire frame may be made by such leverage as is now in common use, and I do not therefore desire to limit myself to the special means described and claimed for effecting these operations when the cutting-table is converted into and used in light machines, and I have therefore claimed the elements, in combination, which constitute those of my invention independent of the mechanism for reciprocating the cutting-table and the endwise-moving table. The endwise movements of the table-frame D are effected through the instrumentality of the reciprocations of the rod or bar 23, accomplished through the action of the connected yoke 24 and wheel $4^\times$ on the shaft of drum 4, the drum 4 delivering a slab of clay to the apron and in succession the same length to the platen as may be of the requisite length to be severed into forms by the cutting-wire;

and, as specified, to insure a positive and certain delivery of the slab to the cutting-table the gearing 11 and 12, with belt connection to the driving-shaft, is provided. The apron 7 delivers the slab on the projecting rollers *a* in the supports *b* of the cutting-table.

The cutting-wire frame is reciprocated as follows: The driving-shaft is connected to the power, the slab of clay is delivered from the intermediate table to the platen, and is so moved until it progresses far enough thereon to be engaged by all of the cutting-wires. When the adjustment of the gearing and latch mechanism is brought into action and turns the friction-pulleys into engagement, it draws the wire cutting-frame and the slab of clay carrying the wires with it and through the slab, which movement progresses until the rest-point in the friction-pulley is reached, when the wire-frame stands idle until the table is brought back again and begins to move outward endwise and another slab of clay is on the platen, when the friction-pulleys are again brought into contact and the wire-frame returned across the platen and the slabs severed.

Having thus specified my invention, so as to distinguish it from other inventions in the art, I now proceed to particularly point out and distinctly claim the parts, improvements, and combinations I consider as my invention as follows:

1. In a brick and tile machine, the combination of a supporting-frame, a carrying-apron supported in the frame, and drums at the ends of the frame, about which the apron is arranged, the forward one of said drums being of the requisite circumferential measurement to deliver at one revolution a column of clay from the apron of the length of the column to be cut into forms, substantially as specified.

2. In a brick and tile machine, the combination, with the end drum of the slab-carrying table and the cutting-table of the machine, of a disk-wheel on the shaft of the said end drum provided with a pin in its rim-edge, guide-rollers supported on the side of the slab-carrying table, a sliding bar arranged between the rollers, a yoke fixed to the sliding bar and arranged to be moved by the engagement of the pin on the disk, and a connecting-rod between the sliding bar and the cutting-table, substantially as described.

3. In a brick and tile machine, the combination, with the slab-carrying apron supported on drums at the ends, of a gear-wheel mounted on the shaft of one of the drums, a shaft on the side of the frame and provided with a gear meshing with the gear on the drum, and a pulley, a driving-shaft provided with a pulley, and a belt connecting the pulleys, substantially as and for the purpose specified.

4. In a brick and tile machine, the combination, with the endwise-movable frame of the cutting-table and the apron-supporting drum of the slab-carrying table, of a yoke, a disk on the shaft of the drum provided with a pin to engage and reciprocate the yoke, and a connecting-rod between the yoke and the endwise-movable frame of the cutting-table, substantially as described.

5. In a brick and tile machine, the combination, with the slab-carrying apron, of a tightening-pulley bearing on the under line of the apron, and a sand-box under the tightener arranged to have the apron pass through it, substantially as described.

6. In a brick and tile cutting table, the combination of the friction-pulley having oppositely-arranged cut-away places in its face and formed with notches in its rim-edge, an arm loosely mounted on the shaft of the friction-pulley, a pawl on the end of the arm, and means, substantially as described, for moving the arm on the shaft and drawing the friction-pulley over the cut-away portions, substantially as described.

7. In a brick and tile cutting table, the combination of the friction-pulley having oppositely-arranged cut-away places in its face and reversely-arranged notches oppositely arranged in its rim-edge, an arm loosely mounted on the shaft of the friction-pulley, a pawl on the end of the arm to push the pulley over the cut-away places, an arm projected from the frame of the table, a latch on the end of the arm to hold the pulley, and means, substantially as described, for lifting the latch and moving the arm on the shaft, substantially as described.

8. The combination, with a friction-pulley having oppositely-arranged cut-away places in its face and reversely-arranged and oppositely-disposed notches in its rim-face, of a vertically-arranged shaft in the endwise-moving frame, having arms projected from its upper and lower portions, an arm loosely mounted on the shaft of the friction-pulley, a pawl on the end of the arm to engage a notch in the friction-pulley, a connecting-rod between said arm and the upper arm of the vertical shaft, a slotted plate on the base of the table-frame to take and guide the end of the lower arm on the vertical shaft, and an arm projected from the frame of the machine and carrying a latch on the end to engage the notch reversibly to the pawl, substantially as and for the purpose set forth.

9. The combination, with the friction-pulley having oppositely-arranged cut-away places in its face and reversely-disposed notches in its edge-rim, the arm loosely mounted on the shaft of the friction-pulley, means for imparting reciprocating motion to the arm, as described, and an arm projected from the frame of the machine, of the pawl on the end of the first-named arm having an inclined way in its face, and a latch on the end of the other arm formed with a lug to engage in the way of the pawl, substantially as described.

10. In a brick and tile cutting table, the combination, with a reciprocating wire-frame having the cutting-wires stretched centrally therein, and a stationary central platen formed with vertical standards at each end of the respective sections of the table, substantially as and for the purpose specified.

11. In a brick and tile cutting table, a platen composed of a number of bottom frames formed with vertical standards at their opposite ends and arranged with wire spaces between them, substantially as described.

12. In a brick and tile cutting table, the combination of an endwise-movable supporting-frame, a platen composed of a number of frames having vertical end standards and arranged on the support with wire spaces between them, a reciprocating wire-holding frame to traverse across the platen, and means for moving the supporting-frame endwise and for reciprocating the wire-frame transversely, substantially as described.

13. The combination, with the wire-holding frame of a brick and tile machine, of a wire stretching and holding means consisting of a washer on the cross-bar of the frame, an elastic cushion on the washer, a washer on the cushion, and an angular eccentric on the top washer having the wire connected thereto, as described.

14. In a brick and tile cutting table, the wire-holding frame herein described, consisting of a frame having a centrally-disposed bottom cross-bar to hold the lower ends of the wires and centrally-arranged cross-bars to hold the top end of the wires, and the series of wires stretched between the centrally-arranged bottom and top cross pieces.

In witness whereof I have hereto set my hand in the presence of two attesting witnesses.

JOHN THOMPSON.

Attest:
W. CLARENCE DUVALL,
WM. H. BATES.